United States Patent [19]
Suda et al.

[11] Patent Number: 5,734,428
[45] Date of Patent: Mar. 31, 1998

[54] CAMERA WITH SUPERIMPOSE DISPLAY DEVICE

[75] Inventors: Yasuo Suda; Jun Terashima, both of Yokohama; Masayuki Tanaka, Kagoshima; Kazuyuki Nakagawa, Yokohama, all of Japan

[73] Assignee: Canon Kabushiki Kaisha, Tokyo, Japan

[21] Appl. No.: 398,130

[22] Filed: Mar. 3, 1995

[30] Foreign Application Priority Data

Mar. 4, 1994 [JP] Japan .................. 6-034628
Jul. 29, 1994 [JP] Japan .................. 6-178621

[51] Int. Cl.$^6$ .................................. H04N 5/225
[52] U.S. Cl. .................. 348/341; 348/341; 348/232; 354/409; 354/408; 354/84; 354/143
[58] Field of Search .................. 354/409, 408, 354/84, 143; 348/341, 232; H04N 5/225

[56] References Cited

U.S. PATENT DOCUMENTS 4,304,472  12/1981  Shinoda .................. 354/23
4,704,022  11/1987  Nozawa .................. 354/219
5,182,443  1/1993  Suda .................. 250/201.2

*Primary Examiner*—John K. Peng
*Assistant Examiner*—Vivek Srivastava
*Attorney, Agent, or Firm*—Fitzpatrick, Cella, Harper & Scinto

[57] ABSTRACT

There is disclosed a superimpose device for a single-lens reflex camera, which has a finder optical system including a focusing screen, a pentagonal roof type prism, and an eyepiece lens, a reflection plate which is arranged near the prospective imaging plane the finder optical system, and has micro-prisms forming a display portion, a plurality of light sources arranged near the vertex of the prism, and a projection optical element for deflecting illumination light from each light source by a reflection surface, and projecting the deflected light toward a front upper portion of the prism. The display portion illuminated with the illumination light via the prism, and light reflected by the display portion is guided to the eyepiece lens.

9 Claims, 17 Drawing Sheets

CAMERA WITH SUPERIMPOSE DISPLAY DEVICE

BACKGROUND OF THE INVENTION

1. Field of the Invention

The present invention relates to a camera such as a single-lens reflex camera, a still video camera, or the like and, more particularly, to a camera which has a superimpose display device, for example, a finder display device for multi-point distance measurement, or a combination of an intra-finder display of the multi-point distance measurement device and a visual axis position detection device.

2. Related Background Art

Conventionally, as a camera with a superimpose display device, for example, a camera described in Japanese Laid-Open Patent Application No. 4-278931 is known. In this camera, display portions constituted by reflection surfaces are arranged at the distance measurement positions on a focusing screen, and are illuminated using a projection lens and a light source which are arranged on an upper front portion of a pentagonal roof type prism, so that light reflected by each display portion can be observed via the pentagonal roof type prism and an eyepiece lens. More specifically, the distance measurement points of a multi-point distance measurement device are displayed in a finder, their display portions are constituted by reflection surfaces, and the selected distance measurement point is illuminated with illumination light from a corresponding light source.

Since the projection lens and the light source are laid out on the upper front portion of the pentagonal roof type prism, the upper cover of the camera requires a bulged portion for accommodating these members. In particular, when an accessory shoe to which an electronic flash device or the like is connected is arranged on the upper portion of the eyepiece lens, it must be arranged above the bulged portion, since light emitted from the flash device is eclipsed by the bulged portion if the accessory shoe is arranged at a relatively low level.

As another camera with a superimpose display device, for example, a camera described in Japanese Laid-Open Patent Application No. 4-345150 or 6-82678 is known. The technique described in The former patent application relates to a single-lens reflex camera in which a guest-host type liquid crystal display plate is arranged between a pentagonal prism and a focusing screen. Two box-shaped support members are stacked to form double bottom surfaces, and the liquid crystal display plate is arranged between the double bottom surfaces, so that an object image and a displayed content can be visually confirmed at the same time.

The latter technique realizes a light-emission type superimpose display on the basis of the principle that a display portion as a group of micro-prisms is formed on the focusing screen of a camera, and when the display portion is illuminated in an oblique direction, only light components refracted by the prisms can be observed through a finder optical system.

In these known techniques, the liquid crystal display plate and the focusing screen serve as a display member of a superimpose display device.

However, in the camera assembled with the liquid crystal display plate, a camera must be disassembled to detach the liquid crystal display plate. For example, a repair upon attachment of dust onto the liquid crystal display plate requires a very large number of processes. Dust on the liquid crystal display plate easily stands out since the diopter of the finder optical system matches it, and often disturbs observation of an object image.

Although the liquid crystal display plate cannot be easily exchanged, it is preferred if one can selectively use display plates of different display formats.

On the other hand, in Japanese Laid-Open Patent Application No. 6-82678, since the display portion is arranged on the focusing screen, the focusing screen which also serves as a superimpose display member can be easily detachably arranged using the technique disclosed in, e.g., Japanese Utility Model Publication No. 57-16175 or 57-37132. However, in this case, the display portion must be formed on all exchangeable focusing screens on which scale marks, an image frame for a panoramic photographing mode, and the like are printed. In addition, although exchangeable focusing screens for cameras are designed to be used in many types of cameras, the above-mentioned camera with the superimpose display device cannot use the exchangeable focusing screens available so far. In particular, since a single-lens reflex camera places an importance on the compatibility of accessories, the marketability of such a camera can be improved if the above-mentioned problems are solved.

U.S. Pat. No. 5,119,124 also discloses a camera assembled with a superimpose device.

SUMMARY OF THE INVENTION

It is the first object of the present invention to provide an optical apparatus which can make a superimpose display.

It is the second object of the present invention to prevent the upper portion of a camera from becoming bulky by an illumination system for illuminating a superimpose display device.

It is the third object of the present invention to provide a camera which has a finder optical system which is used for observing an object image formed on a focusing screen by an imaging optical system via a pentagonal roof type prism and an eyepiece lens, and display means which allows, using the eyepiece lens to observe, together with the object image, light which is irradiated by illumination means via the pentagonal roof type prism and reflected by a display portion on the focusing screen or on a reflection plate arranged near a prospective imaging plane of the object image, wherein the illumination means comprises a light source arranged in the vicinity of a vertex of the pentagonal roof type prism, and a projection optical element for deflecting illumination light from the light source and projecting the deflected light toward a surface of an upper portion of the pentagonal roof type prism.

With this arrangement, the light source and the projection optical element of the illumination means can be arranged before and after, in the projection optical axis direction, the vertex of, e.g., a solid or hollow pentagonal roof type prism, and the space around the pentagonal roof type prism can be effectively utilized. As a result, no extra bulged portion is required, and the camera can be rendered compact.

A connection portion to which a device such as an electronic flash device is connected is arranged on the rear portion of the upper surface of an outer cover member which covers the outer surface of the pentagonal roof type prism. Since the light source of the illumination means is arranged between the connection portion and the vertex of the pentagonal roof type prism, a bulged portion can be avoided from being formed in front of the connection portion. As a result, light emitted from the electronic flash device can be prevented from being eclipsed by the case member.

In the camera according to the present invention, when the distance measurement points of a multi-point distance measurement device are displayed in the finder field, and a display portion of the selected distance measurement point is displayed by illumination, a plurality of display portions of the display means can be arranged, and a plurality of light sources of the illumination means can be arranged in correspondence with these display portions.

Using light source driving means for selectively driving the plurality of light sources, an arbitrary display portion can be illuminated.

The projection optical element of the illumination means has a first total reflection surface corresponding to the vertex of the pentagonal roof type prism, and a second total reflection surface for reflecting illumination light reflected by the first total reflection surface toward the surface of the upper portion of the pentagonal roof type prism. With this arrangement, illumination light can be guided to the pentagonal roof type prism while effectively utilizing the space around the pentagonal roof type prism. Since the projection optical element of the illumination means has a lens portion having a focusing function and total reflection surfaces for guiding a light beam from the light source toward the lens portion, it can deflect illumination light from the light source in correspondence with the outer shape of the pentagonal roof type prism without scattering it, and can irradiate the light onto a predetermined surface of the pentagonal roof type prism.

It is the fourth object of the present invention to realize a display mechanism which can operate a superimpose function even when a conventional focusing screen is attached, and allows easy detachment of the focusing screen.

More specifically, the fourth object is to provide a camera which simultaneously satisfies requirements of easy maintenance upon attachment of dust to a display plate for superimpose display, and use of versatile focusing screens.

It is the fifth object of the present invention to prevent a reflection plate from being accidentally detached upon exchange of focusing screens and a display member when the fourth object is achieved.

More specifically, in a normal use state, the exchange frequency of focusing screens may be considered to be much higher than that of the display member. However, both of these members are transparent planar members having a size almost equal to the frame size, and are often confused with each other. However, although the exchange frequency of the focusing screen is high upon comparison with that of the display member, a user rarely exchanges focusing screens, and it is difficult for the user to distinguish the display member from the focusing screen. In view of this problem, an arrangement which can preferentially release the holding state of the focusing screen of the two members, which are arranged adjacent to each other, is realized.

It is the sixth object of the present invention to realize a mechanical structure which can prevent the focusing screen from being damaged upon detachment of the display member.

It is the seventh object of the present invention to provide a camera, which has a focusing screen, a display member for superimpose display, which is arranged in the vicinity of the focusing screen, and a finder optical system for guiding a light beam transmitted through the focusing screen and the display member, comprising display member holding means for detachably holding the display member.

With this arrangement, the display member, which operates a superimpose function even when a conventional focusing screen is attached, and can be easily detached, can be realized.

It is the eighth object of the present invention to provide a camera which has a focusing screen, focusing screen holding means for detachably holding the focusing screen, a display member for performing a superimpose display in a finder, display member holding means for detachably holding the display member, and shielding means for shielding the display member holding means with respect to a photographing optical path, wherein the release operations of both the focusing screen holding means and the display member holding means are allowed in a state in which the shielding means is detached, and the release operation of only the focusing screen holding means is allowed in a state in which the shielding means is attached.

With this arrangement, the focusing screen can be attached/detached without detaching the shielding means. However, the display member cannot be attached/detached unless the shielding means is detached. Therefore, the focusing screen with a high exchange frequency can be prevented from being confused with the display member.

It is the ninth object of the present invention to prevent by the focusing screen or the focusing screen holding means the display member held by the display member holding means from being detached in a state wherein the focusing screen is held by the focusing screen holding means.

With this arrangement, since the display member cannot be detached unless the focusing screen is detached, the focusing screen can be prevented from being inadvertently damaged upon detachment of the display member.

DETAILED DESCRIPTION OF THE PREFERRED EMBODIMENTS

FIGS. 1 to 4 show the first embodiment of a camera according to the present invention.

Figure 1:
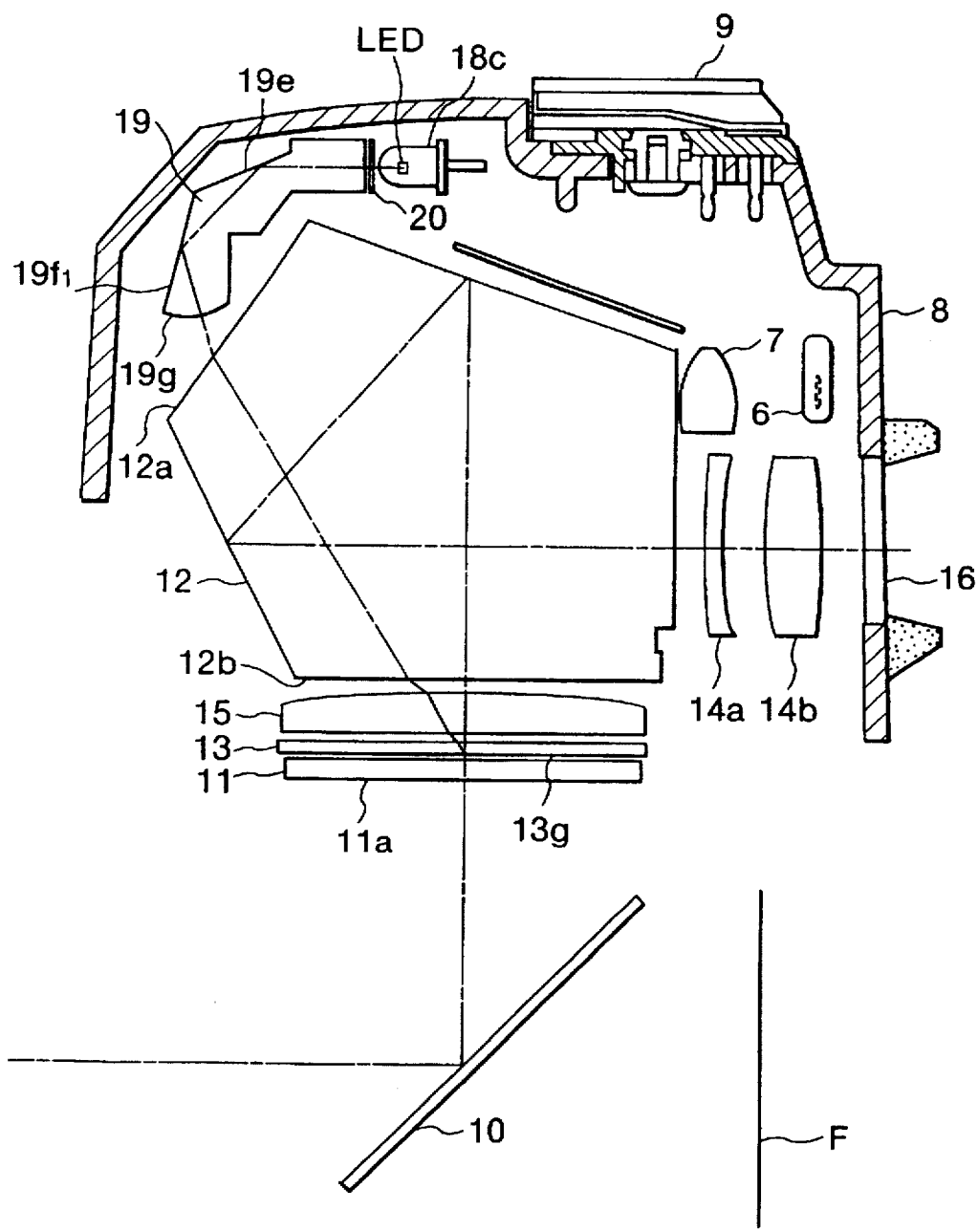
FIG. 1 is a longitudinal sectional view of principal part of a camera according to the first embodiment of the present invention.
Figure 2:
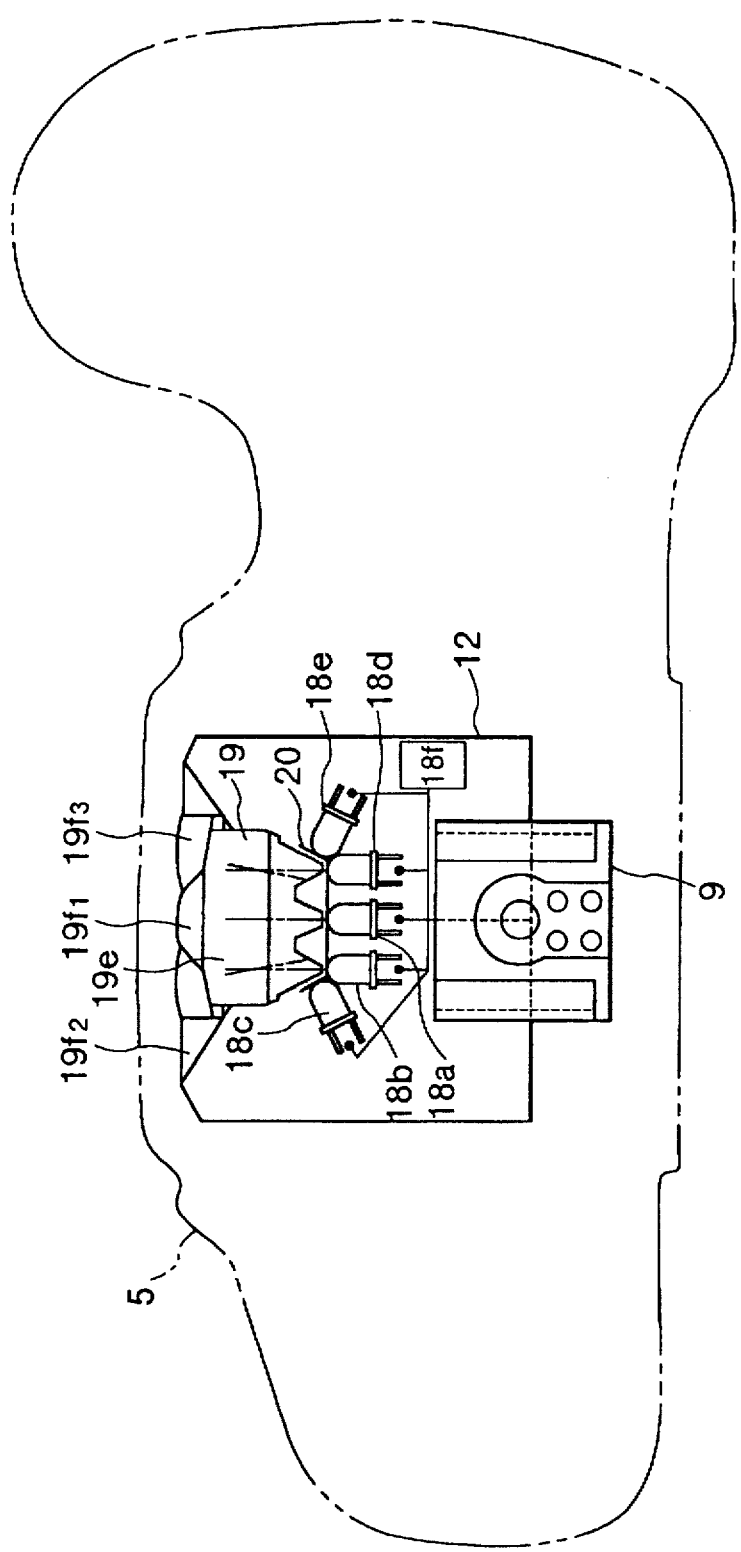
FIG. 2 is a cross-sectional view of principal part of FIG. 1.

FIGS. 1 and 2 show an example of a single-lens reflex camera, in which FIG. 1 is a longitudinal Sectional view of the camera, and FIG. 2 is a top perspective view of the camera body.

Referring to FIGS. 1 and 2, the camera comprises a single-lens reflex camera main body 5, a film F, and a movable mirror 10 which pops up upon exposure of a film. Note that a photographing lens is attached on the left side (FIG. 1) of the movable mirror 10. The camera also comprises a focusing screen 11 which has a Fresnel lens 11a on its light entrance surface, and a matte surface 11b on its light exit surface, a reflection plate 13 which has a display portion for superimpose display on its surface 13g, a condenser lens 15, a pentagonal roof type prism 12 having a front reflection surface and a roof Type reflection surface, eyepiece lenses 14a and 14b, and a projection glass 16, which constitute a finder system.

The camera comprises a photometry sensor 6 and a photometry lens 7, which are used for measuring the luminance of an object.

Furthermore, the camera comprises a projection lens 19 which is arranged to extend from the upper front portion to the upper portion of the pentagonal room prism 12. Five LED (light-emitting diode) packages 18a, 18b, 18c, 18d, and 18e each including an LED as a light source, and a mask 20 are attached to a portion above the pentagonal roof type prism 12. The LEDs 18a to 18e are selectively turned on by a driving circuit 18f.

Light emitted by each LED is visible light, and is incident on the projection lens 19. The light reflected and focused by the projection lens 19 is guided to the display portion of the reflection plate 13 to enable a superimpose display function.

An upper cover 8 accommodates the above-mentioned elements. An accessory shoe 9 is arranged on the upper cover 8, and an electronic flash device or the like can be connected to the accessory shoe 9. The accessory shoe 9 is arranged immediately above the optical axis of the photographing lens, and a flash photographing operation free from a shadow can be performed when the camera is held at a regular position. The LED packages are arranged between the vertex of the pentagonal roof type prism 12 and the accessory shoe 9, and the shape of the upper cover of the camera, which accommodates these members is equivalent to that of a conventional single-lens reflex camera.

The finder field of the camera will be described below with reference to a case wherein distance measurement field frames for a focus detection device are arranged as the display portions.

Figure 3:
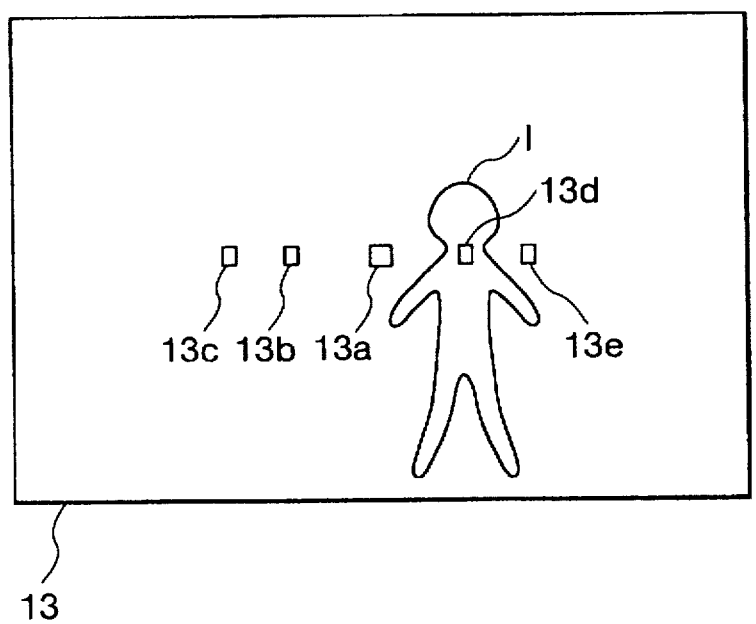
FIG. 3 is a view showing an intra-finder display of the camera shown in FIG. 1.

FIG. 3 is a plan view of the reflection plate 13 shown in FIG. 1. In FIG. 3, distance measurement field frames 13a to 13e are arranged at the center of the frame in the horizontal direction, and indicate the distance measurement field positions of the focus detection device (not shown).

The finder field of the camera includes en external field display portion which is located outside an object image field and displays photographing conditions such as the shutter speed aperture value, exposure correction value, and the like, and the distance measurement field frames 13a to 13e located inside the object image field. The distance measurement field frames 13a to 13e are achieved by a so-called superimpose display, so that they can be observed together with an object image L.

Note that the display portions for the superimpose display may be arranged on the focusing screen in place of the reflection plate.

The superimpose display method will be described below with reference to FIG. 4.

Figure 4:
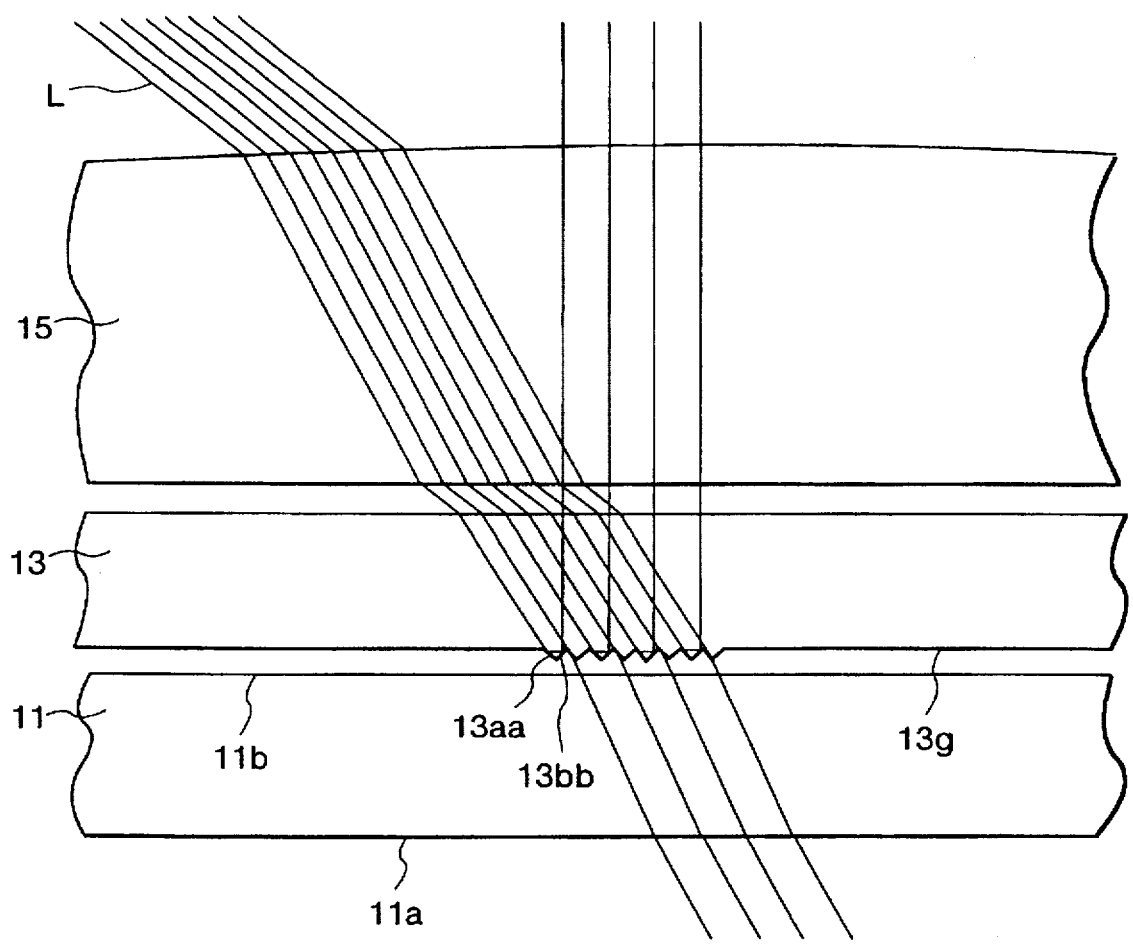
FIG. 4 is an enlarged sectional view showing the relationship between the section of a superimpose display portion and the optical paths of an illumination optical system and a finder optical system.

FIG. 4 is an enlarged sectional view obtained when the distance measurement field frames are viewed sideway, and expresses that both the vertical and horizontal lines of each distance measurement field frame are defined by a large number of micro-prisms along a direction perpendicular to the plane of the drawing of FIG. 4. The sectional shape of the distance measurement field frame corresponds to a group of triangular projections each having one edge.

Therefore, a light beam incident on the distance measurement field frames 13a to 13e via the photographing lens (not shown) is refracted by these field frames and deviates from the direction of the eyepiece lenses 14a and 14b. For this reason, this portion normally appears darker than the surrounding matte surface 11b.

On the contrary, when the distance measurement field frames on the reflection plate 13 are illuminated from an obliquely upward position, for example, a light ray L, incident on the reflection plate 13, is totally reflected by a tilt surface 13aa of a prism constituting each distance measurement field frame, is also totally reflected by an opposing tilt surface 13bb, and propagates upward to be observed. On the other hand, a light beam, which is not incident on the prisms constituting the distance measurement field frames, is transmitted through the focusing screen and propagates in the direction of the movable mirror 10. For this reason, such a light beam is not visually observed.

As described above, the distance measurement field frames constituted by micro-prisms have characteristics for deflecting light from an obliquely upward position to a position immediately thereabove, and by utilising this characteristics, the display color of the distance measurement field frames can be changed by controlling illumination light.

The above-mentioned illumination by the LEDs is to realise such a superimpose display. For example, when red LEDs are used, the distance measurement field frames which normally appear black may be selectively illuminated in red in an in-focus state.

The same display method applies to the distance measurement field frames located at a position deviated from the finder optical axis. If the LED serving as the light source is present on an extension line which follows the optical path connecting the eyeball of a user and the corresponding distance measurement field frame in the opposite direction upon development of the optical path, the distance measurement field frame is observed as an illuminated frame. By depositing a reflection surface on the focusing screen, the display member having the same function as described above can be manufactured.

Referring back to FIGS. 1 and 2, the path of a light beam emitted by one LED to the reflection plate 13 will be explained below. Since this illumination optical system is symmetrical, only the optical paths corresponding to the LED packages 18a, 18b, and 18c will be explained.

Figure 5:
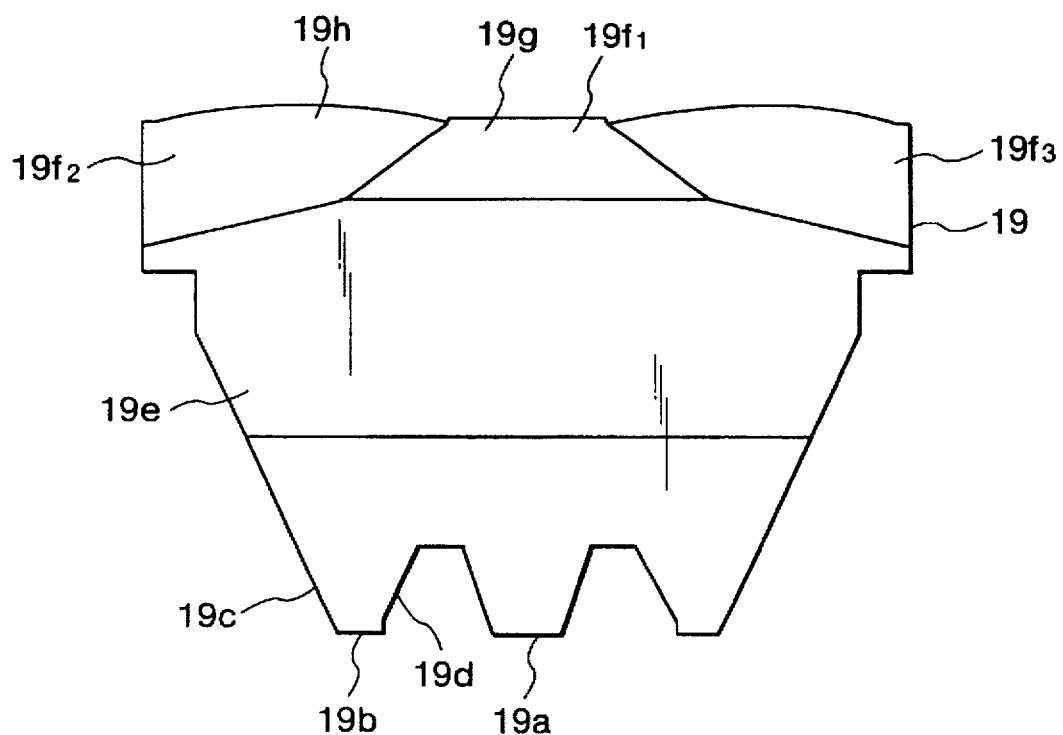
FIG. 5 is a perspective view of a projection lens shown in FIG. 1.
Figure 6:
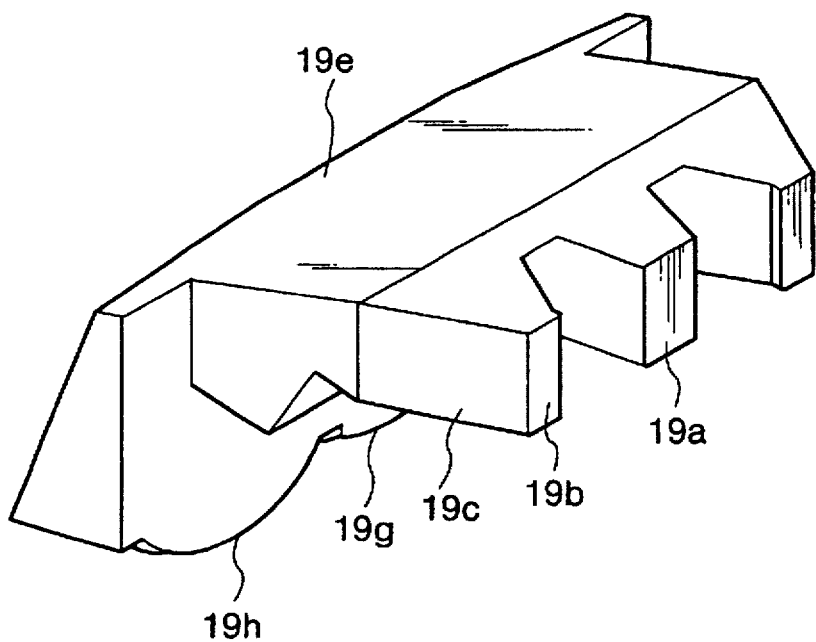
FIG. 6 is a plan view of the projection lens shown in FIG. 1.
Figure 7:
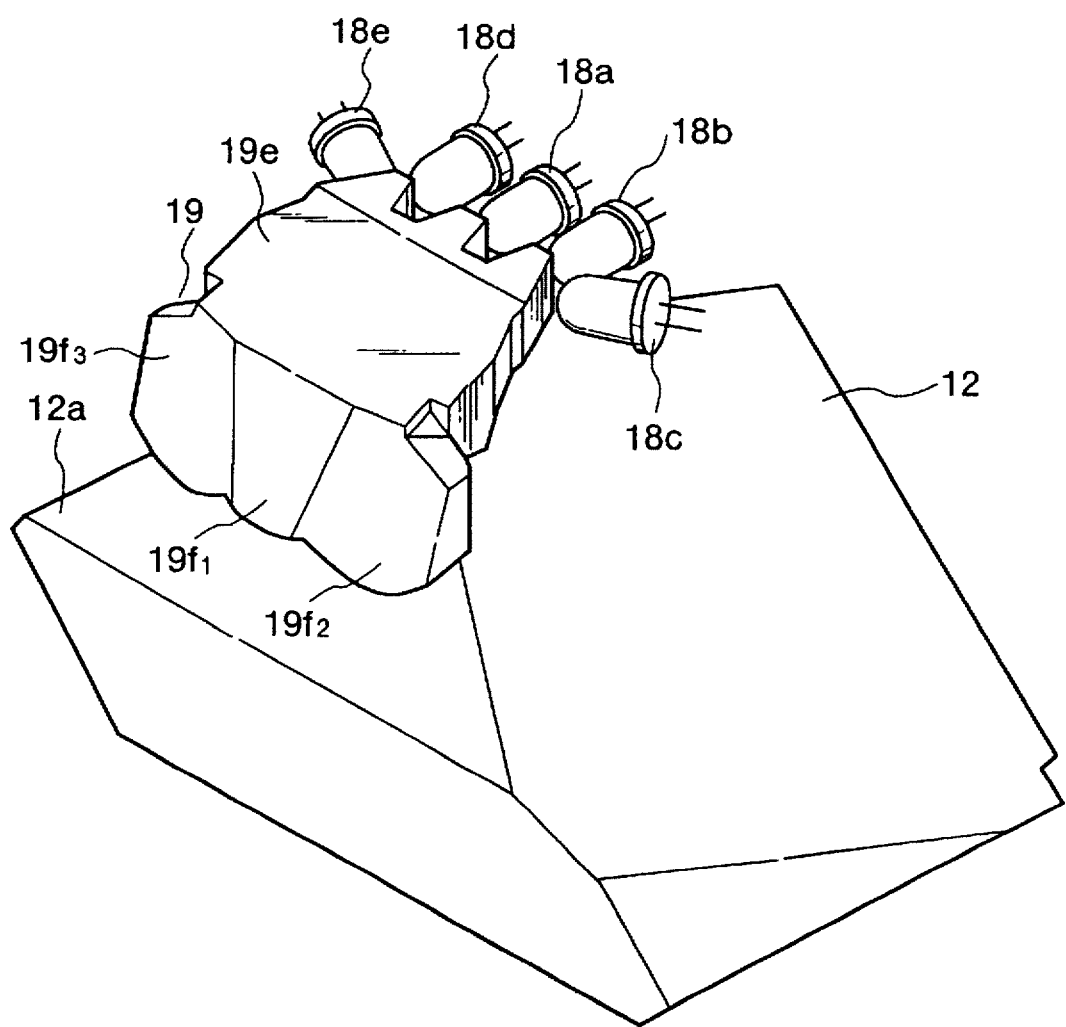
FIG. 7 is a perspective view showing the illumination optical system of a superimpose display device shown in FIG. 4.

Light emitted by the LED package 18a arranged on the photographing optical axis is limited by an aperture (not shown) provided to the mask 20, and is incident on the projection lens 19. The projection lens 19 has a large number of split incident surfaces, as shown in the detailed plan view in FIG. 5 and the perspective views in FIGS. 6 and 7, and a surface 19a corresponds to the incidence surface of a light beam emitted by the LED package 18a. The light beam which enters the projection lens 19 via the surface 19a is totally reflected by a surface 19e and a surface $19f_1$, and reaches the distal end lens portion in an almost loss-less state. Since the optical path is bent by these reflection surfaces, the illumination system has a shape conforming to the upper portion of the pentagonal roof type prism 12.

The projection lens 19 has three lens portions. As for a light beam emitted by the LED package 18a, only light beam components transmitted through a lens portion 19g become an effective light beam. More specifically, light beam components transmitted through other lens portions are not observed via the finder since they do not propagate in the direction of the eyepiece lenses 14a and 14b even if they are reflected by any distance measurement field frames (display portions).

The lens portion 19a has an effect of setting the projection relationship between the above-mentioned reflection plate 13 and the mask 20. The light beam emerging from the lens portion 19a is focused, and is incident into the pentagonal roof type prism 12 via a surface 12a of the prism 12. Thereafter, the light beam emerges from a surface 12b of the pentagonal roof type prism, and reaches the distance measurement field frame 13a formed on the lower surface of the reflection plate 13 via the condenser lens. The light irradiation region on the reflection surface 13 is determined by the aperture size of the above-mentioned mask 20, and has a range which includes at least the distance measurement field frame 13a, but does not extend over the neighboring distance measurement field frames 13b and 13d in order to prevent a ghost caused by crosstalk or the like. The behavior of the rays of light on the reflection plate 13 is as described above with reference to FIG. 4.

Note that the size of the lens portion 19g is set to be larger than that of the distance measurement field frame 13a to guarantee that rays of light which reach from the LED package 18a to the eye are present and the frame are visible even when the eye position deviates from the optical axis by a certain distance upon observation of the distance measurement field frame (display portion) on the reflection plate 13 via the finder.

Light emitted by the LED package 18b will be explained below. Light emitted by the LED package 18b is similarly limited by the aperture provided to the mask 20, and is incident on the projection lens 19. At this time, a surface 19b serves as an incident surface of the light beam from the LED package 18b. The light beam which enters the projection lens 19 is totally reflected by the surface 19e and a surface $19f_2$ to be guided to a lens portion. Of the light beam, light beam components incident on a lens portion 19h become an effective light beam. The lens portion 19h also has an effect of setting the projection relationship between the reflection plate 13 and the mask 20. The light beam emerging from the lens portion 19h is focused, and is incident into the pentagonal roof type prism 12 via the upper front surface 12a of the prism 12. Thereafter, the Light beam emerges from the bottom surface 12b, and reaches the distance measurement field frame 13b on the reflection plate 13 via the condenser lens, The light irradiation region on the reflection plate 13 has a range which includes at least the distance measurement field frame 13b, but does not extend over the neighboring distance measurement field, frames 13a and 13c in order to prevent a ghost.

Light emitted by the LED package is similarly limited by the aperture provided to the mask 20, and is incident on the projection lens 19. At this time, a surface 19c serves as an incident surface of the light beam from the LED package 18c. The light beam which enters the projection lens 19 is totally reflected by a surface 19d, and replaces the light beam from the LED package 18b. The reason why the optical paths replace one another in this design is to allow layout of large-size LED packages which are advantageous in light amount. If the total reflection surface 19d is not formed, the LED package 18c must be inserted between the LED packages 18a and 18b. At this time, a decrease in light amount due to the use of small-size packages is considerable.

The light beam reflected by the surface 19d is totally reflected by the surfaces 19e and $19f_2$, and reaches the distal end lens portion. In this case, light beam components incident on the lens portion 19h become an effective light beam as in the light beam from the LED package 18b. As described above the lens portion 19h has an effect of setting the projection relationship between the reflection plate 13 and the mask 20. The light beam emerging from the lens portion 19h Is focused, and is incident into the pentagonal roof type prism 12 via the surface 12a of the prism Thereafter, the light beam emerges from the surface 12b, and reaches the distance measurement field frame 13c on the reflection plate 13 via the condenser lens. The light irradiation region on the reflection plate has a range which includes at least the distance measurement field frame 13c, but does not extend over the neighboring distance measurement field frame 13b in order to prevent a ghost.

The light beams emitted by the LED packages 18b and 18c are projected via The single lens portion 19h since regions where lenses for these light beams should be present overlap each other due to the small interval between the corresponding distance measurement field frames. More specifically, when the layout of this embodiment is adopted, if the distance measurement field frames 13 b and 13c are allowed to be observed with a certain degree of freedom as to the position of the eye that looks into the finder, the passing regions, on the lens portion, of these LED light beams which should reach the eye overlap each other between the corresponding distance measurement field frames. Therefore, when a lens portion common to the plurality of display portions is arranged, a superimpose display can be realised even for distance measurement fields arranged at a high density. For example, of the plurality of display portions, only display portions in an in-focus state or display portions corresponding to operative distance measurement field frames can be illuminated with illumination light from the corresponding LEDs. Of course, the present invention is not limited to the distance measurement fields but is effective for various other displays.

Finally, the illumination system will be explained below again in view of the element layout in the camera. Since the projection lens 19 is arranged on the upper portion of the pentagonal roof type prism 12, and the LEDs serving as the light sources are arranged between the vertex of the pentagonal roof type prism 12 and the accessory shoe 9 using the reflection surfaces 19e and 19f, the upper cover of the camera, which accommodates these components, can have the same shape as that of a general single-lens reflex camera. Even when the accessory shoe is arranged on the upper portion of the eyepiece lens as a position immediately above the optical axis of the photographing lens, light irradiated by the electronic flash device can be prevented from being eclipsed by a bulged portion which accommodates the illumination system.

Furthermore, since the total reflection surfaces 19e and 19f are arranged in the projection lens 19 to increase the distance between the LEDs as the light sources and the lens portions 19g and 19h and to decrease the projection magnification of the mask 20, the precision of the illumination position can be improved and crosstalk of light to the neighboring display portions can be prevented even when an arbitrary ones of the plurality of display portions are selectively illuminated like the distance measurement field frames.

As described above, in a camera which has a finder optical system which is used for observing an object image formed on a focusing screen by an imaging optical system via a pentagonal roof type prism and an eyepiece lens, and display means which allows using the eyepiece lens to observe, together with the object image, light which is irradiated by illumination means via the pentagonal roof type prism and reflected by a display portion on the focusing screen or on a reflection plate arranged near a prospective imaging plane of the object image, the illumination means comprises a light source arranged in the vicinity of a vertex of the pentagonal roof type prism, and a projection optical element for deflecting illumination light from the light source and projecting the deflected light toward a surface of an upper portion of the pentagonal roof type prism. With this arrangement, the light source and the projection optical element of the illumination means can be arranged before and after, in the projection optical axis direction, the vertex of the pentagonal roof type prism, and the space around the pentagonal roof type prism can be effectively utilised. As a result, no extra bulged portion is required, and the camera can be rendered compact.

When a connection portion to which a device such as an electronic flash device or the like is connected is arranged on the rear portion of the upper surface of an outer cover member which covers the outer surface of the pentagonal roof type prism, since the light source of the illumination means is arranged between the connection portion and the vertex of the pentagonal roof type prism, a bulged portion can be prevented from being present in front of the connection portion. As a result, light emitted by the electronic flash device can be prevented from being eclipsed by the outer cover member of the camera, and the electronic flash device can be arranged at an ideal position, i.e., a position immediately above the optical axis of the photographing optical system.

On the other hand, since a large distance can be assured between the projection optical element and the light source of the illumination means, the projection magnification can be reduced. For this reason, in, e.g., an arrangement wherein the distance measurement points of a multi-point distance measurement device are displayed in the finder field, and a display portion of the selected distance measurement point is displayed by illumination, when a plurality of display portions of the display means are arranged, and a plurality of light sources of the illumination means are arranged in correspondence with these display portions to illuminate them, each display portion can be illuminated in a spot-like manner.

In this case, using light source driving means for selectively driving the plurality of light sources, an arbitrary display portion can be illuminated.

The projection optical element of the illumination means has a first total reflection surface corresponding to the vertex of the pentagonal roof type prism, and e second total reflection surface for reflecting illumination light reflected by the first total reflection surface toward the surface of the upper portion of the pentagonal roof type prism. With this arrangement, illumination light can be guided to the pentagonal roof type prism while effectively utilising the space around the pentagonal roof type prism. Since the projection optical element of the illumination means has a lens portion having a focusing function and the total reflection surfaces for guiding a light beam from the light source toward the lens portion, it can deflect illumination light from the light source in correspondence with the outer shape of the pentagonal roof type prism without scattering it, and can irradiate the light onto a predetermined surface of the pentagonal roof type prism. For this reason, the outer cover member which covers the outer surface of the pentagonal roof type prism can have a shape similar to that for accommodating a general pentagonal roof type prism, end this arrangement is also advantageous in terms of design.

Figure 11:
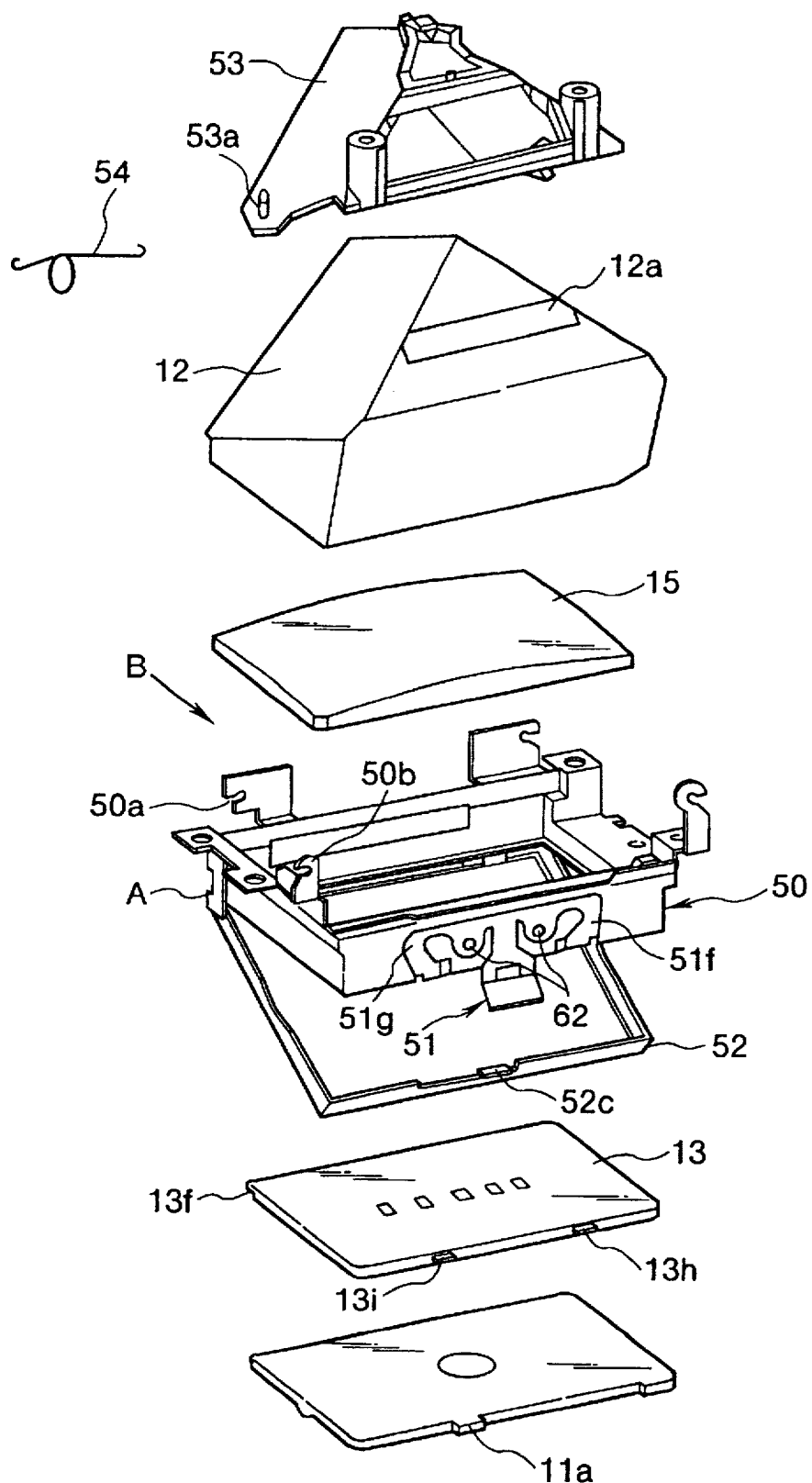
FIG. 11 is an exploded perspective view of a finder unit.
Figure 12:
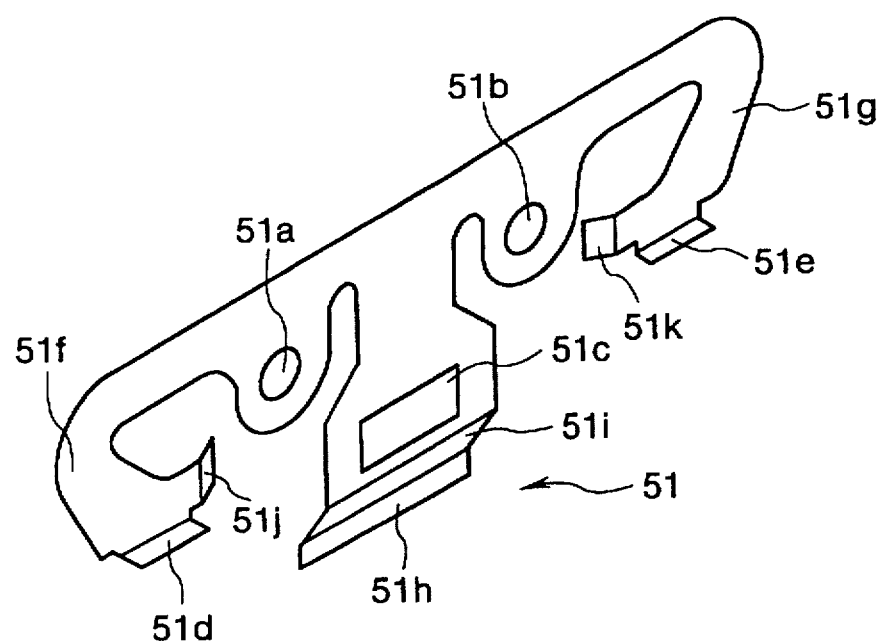
FIG. 12 is a perspective view of a holding member shown in FIG. 11.

FIGS. 11 and 12 are views for explaining e holding mechanism of the display member, focusing screen, and the like.

Referring to FIG. 11, a prism holder 50 holds the condenser lens 15 and the pentagonal roof type prism 12. The prism holder 50 is a box-shaped support member, and has rectangular apertures for receiving a light beam from the focusing screen and a positioning surface 50c for the focusing screen 11 at its lower side, a positioning surface serving as a base portion of the condenser lens 15 and the pentagonal roof type prism 12 and a holding surface 50d of the reflection plate 13 therein, a bearing serving as the center of rotation of a focusing screen holding frame 52 and a holding surface of the reflection plate 13 at its rear end, and an attachment surface of a holding member (to be described later) on its front surface.

A prism pressing member 53 is used for fixing the pentagonal roof type prism 12 to the prism holder 50. Pressing springs 54 (one of right and left springs is illustrated) engage between two hooks 50a and 50b of the prism holder, and hooks 53a of the prism pressing member 53 to press the prism pressing member 53 downward.

A holding member 51 is fixed to the prism holder 50. As shown in FIG. 12 which illustrates a detailed structure when viewed from the direction of an arrow B in FIG. 11, the holding member 51 is a thin plate which has two holes 51a and 51b at its central portion, and two arm portions at its two end portions. The holding member 51 is fixed to the prism holder 50 by inserting pins 62 in the two holes 51a and 51b and corresponding holes (not shown) on the prism holder, and then caulking the pins. The holding member 51 constitutes a focusing screen holding mechanism together with the prism holder 50 and the focusing screen holding frame 52, and also constitutes a display member holding mechanism together with the prism holder 50. The reflection plate 13 and the focusing screen 11 are respectively stored inside the prism holder 50 and the focusing screen holding frame 52. Note that the distance measurement field frames illustrated on the central portion of the reflection plate 13 correspond to those formed on the rear surface 13g, which are seen through. The surface. The constituting elements shown in FIG. 11 can be integrally handled as a finder unit.

Figure 13:
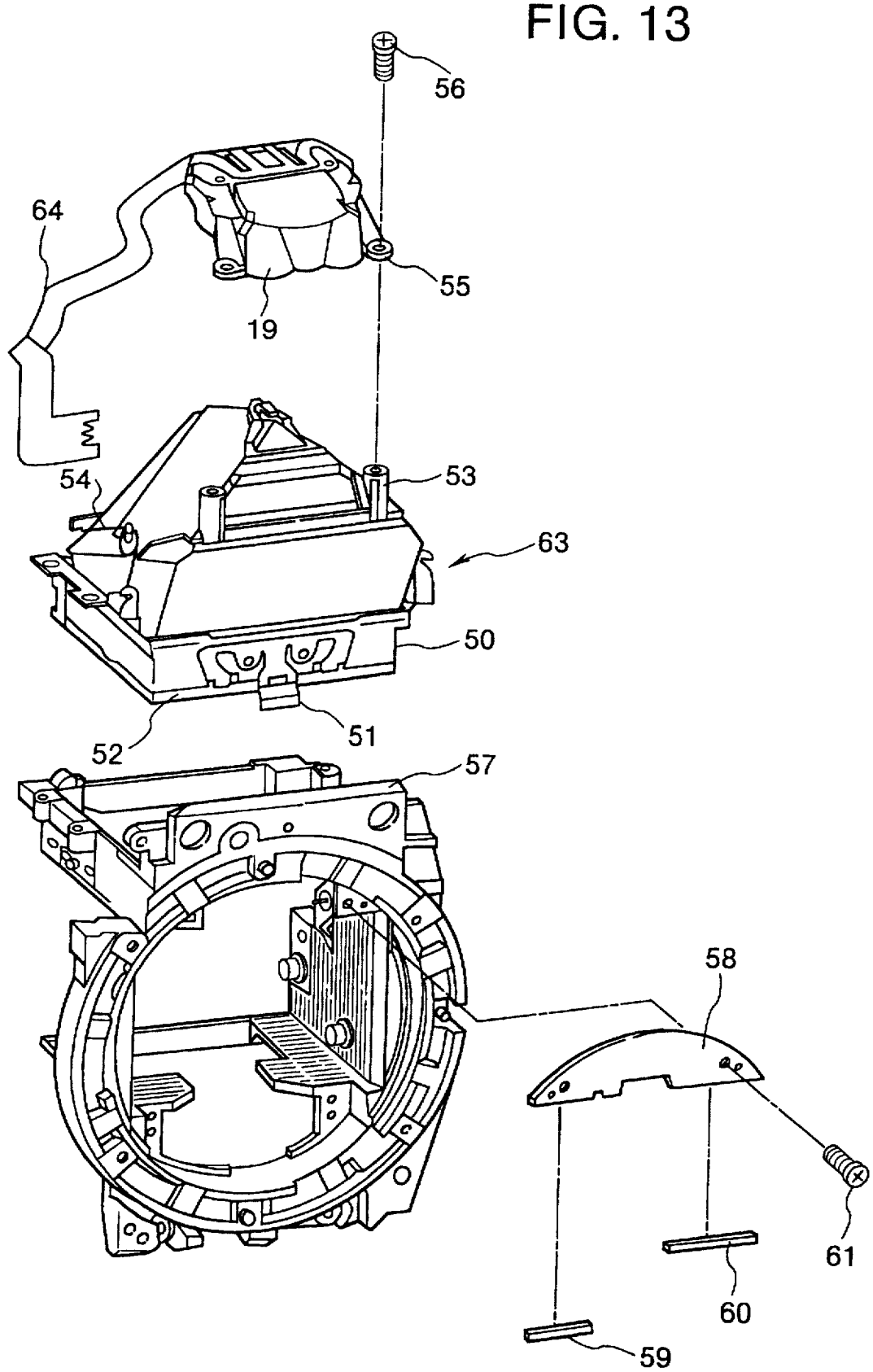
FIG. 13 is an exploded perspective view showing the assembled state of the finder unit.
Figure 14:
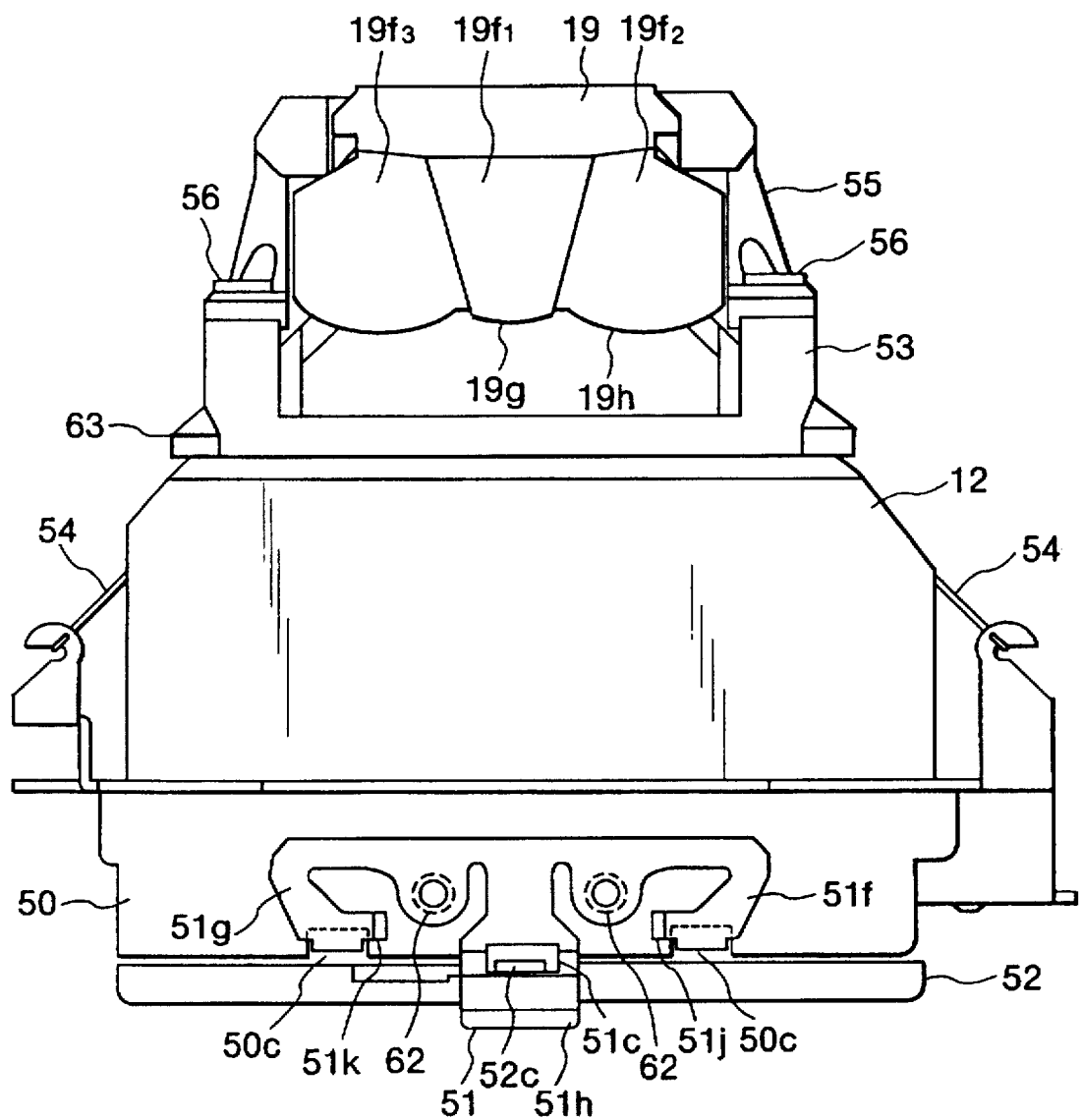
FIG. 14 is a front view of the finder unit shown in FIG. 13.
Figure 15:
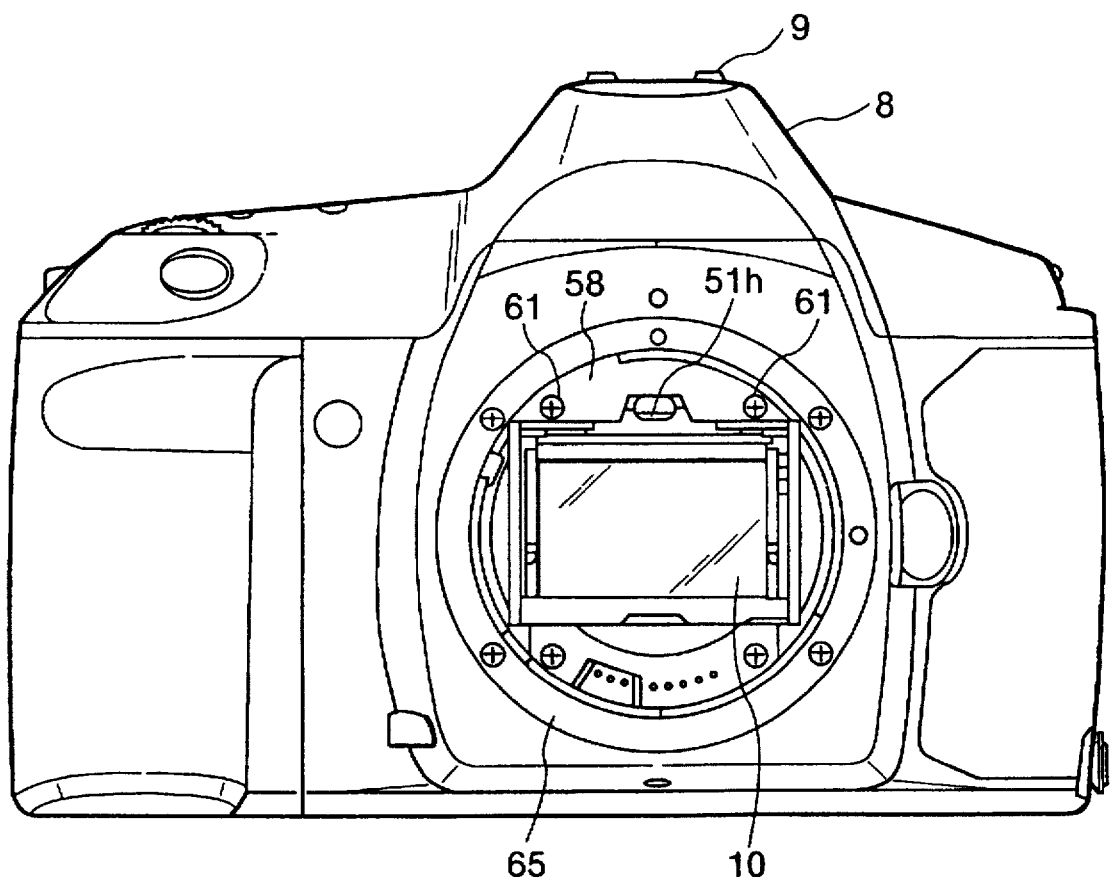
FIG. 15 is a front view showing an embodiment of a camera according to the present invention.

FIGS. 13 to 15 are views for explaining the method of assembling the finder unit into a camera, the holding mechanism of an illumination device, and operation members in a camera complete state.

As shown in the perspective view in FIG. 13, a finder unit 63 is assembled to a mirror box 57 from the above. A holding/driving mechanism of the movable mirror 10 is arranged inside and aside the mirror box 57 although not shown since it is known to those who are skilled in the art. A lens holder 55 integrally holds the projection lens 19, the LED packages 18a to 18e, and the mask 20. A flexible printed circuit board 64, which is illustrated to cover the LED packages in FIG. 13 achieves electrical connections of the LEDs. The lens holder 55 is fixed to the prism pressing member 53 by fixing screws 56, thus completing connection between the illumination device including the LEDs and the projection lens and the finder unit which holds the reflection plate and the focusing screen, as shown in FIG. 14 which shows the front state.

Furthermore, a shielding member 58 to which shock absorbers 59 and 60 for absorbing a shock upon upward movement of the movable mirror 10 are attached is fixed the mirror box 57 from its front side by fixing screws 61, so that the mechanism portion of the finder unit 63 is not seen through a mount 65 (FIG. 15).

FIG. 15 is a front view of the camera in a complete state. In this state, a spring portion 51h of the holding member 51 is operative via a notch at the central portion of the shielding member 58. As will be described later, when the spring portion 51 is pulled forward in a direction perpendicular to the plane of the drawing of FIG. 15, the focusing screen holding mechanism is released.

The shielding member 58 disengages from the mirror box 57 by removing the fixing screws 61, and can be detached via the mount 65. When the shielding member 58 is detached, arm portions 51f and 51g of the holding member 51 shown in FIG. 14 appear, and by pulling forward the two arm portions using upright bent portions 51j and 51k in a direction perpendicular to the plane of the drawing of FIG. 15, the holding state of the reflection plate 13 is released.

Figure 8:
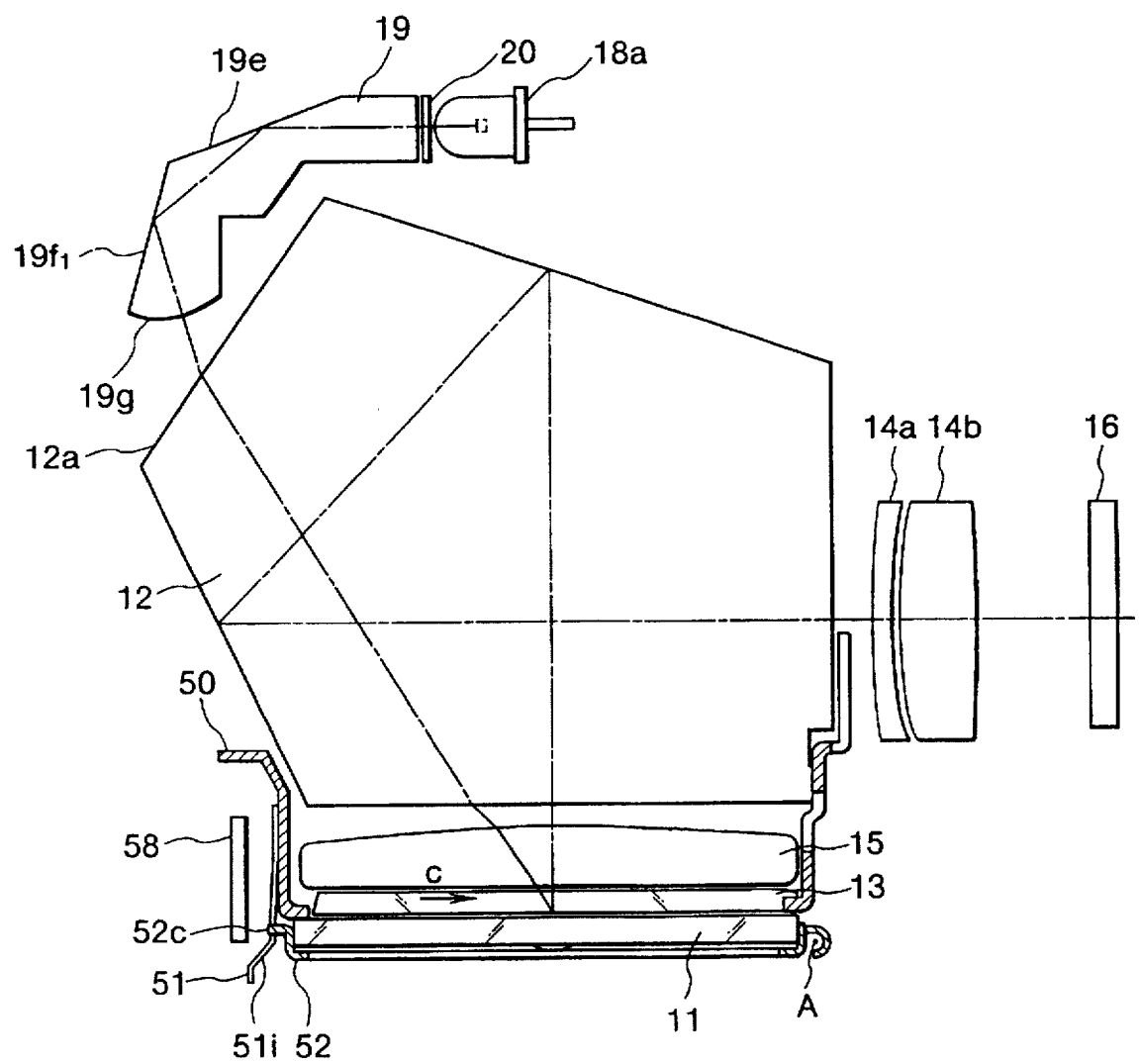
FIG. 8 is a sectional view of the finder optical system of the camera.
Figure 9:
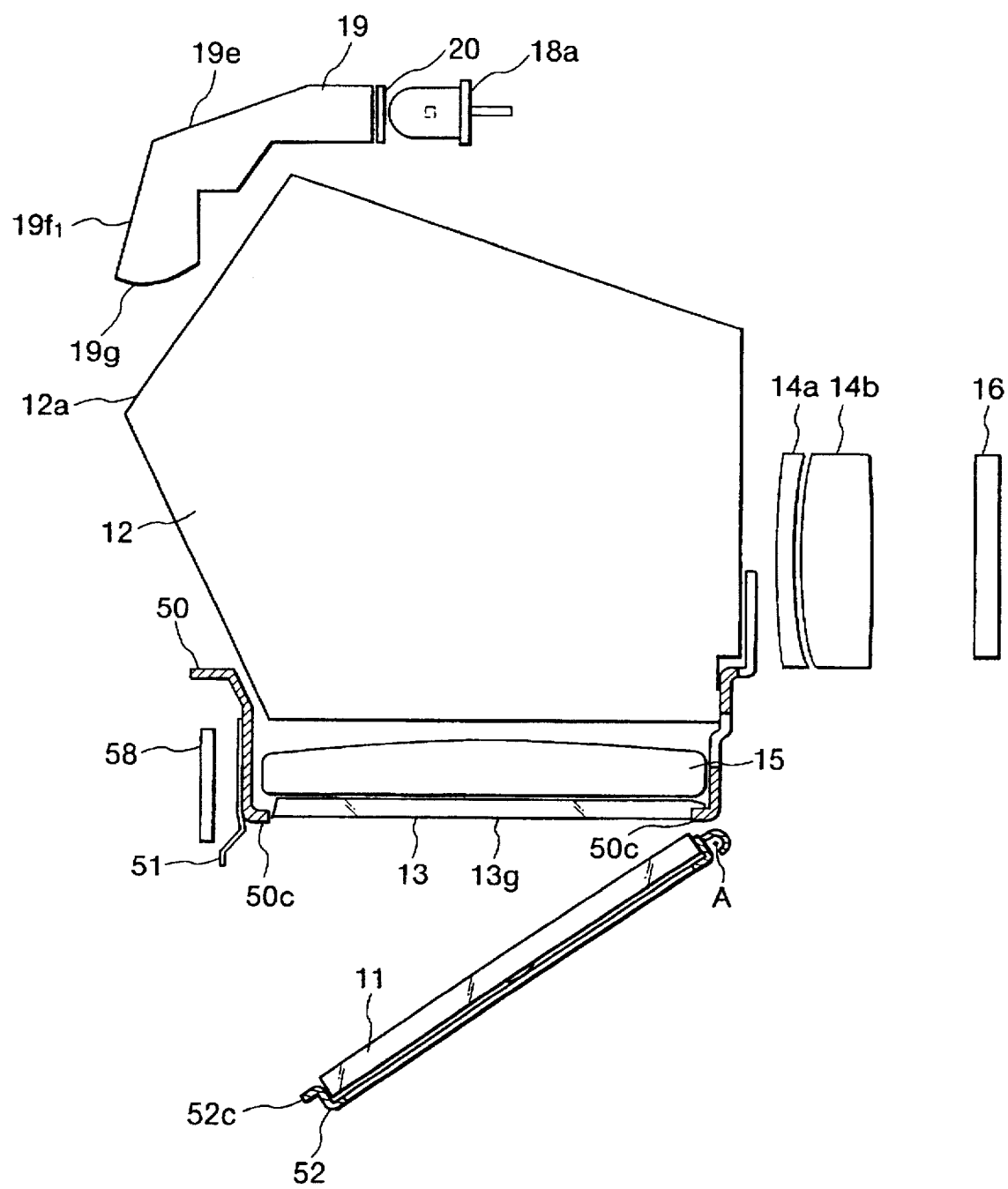
FIG. 9 is a sectional view showing a state wherein a focusing screen holding frame is opened in the finder optical system shown in FIG. 8.
Figure 10:
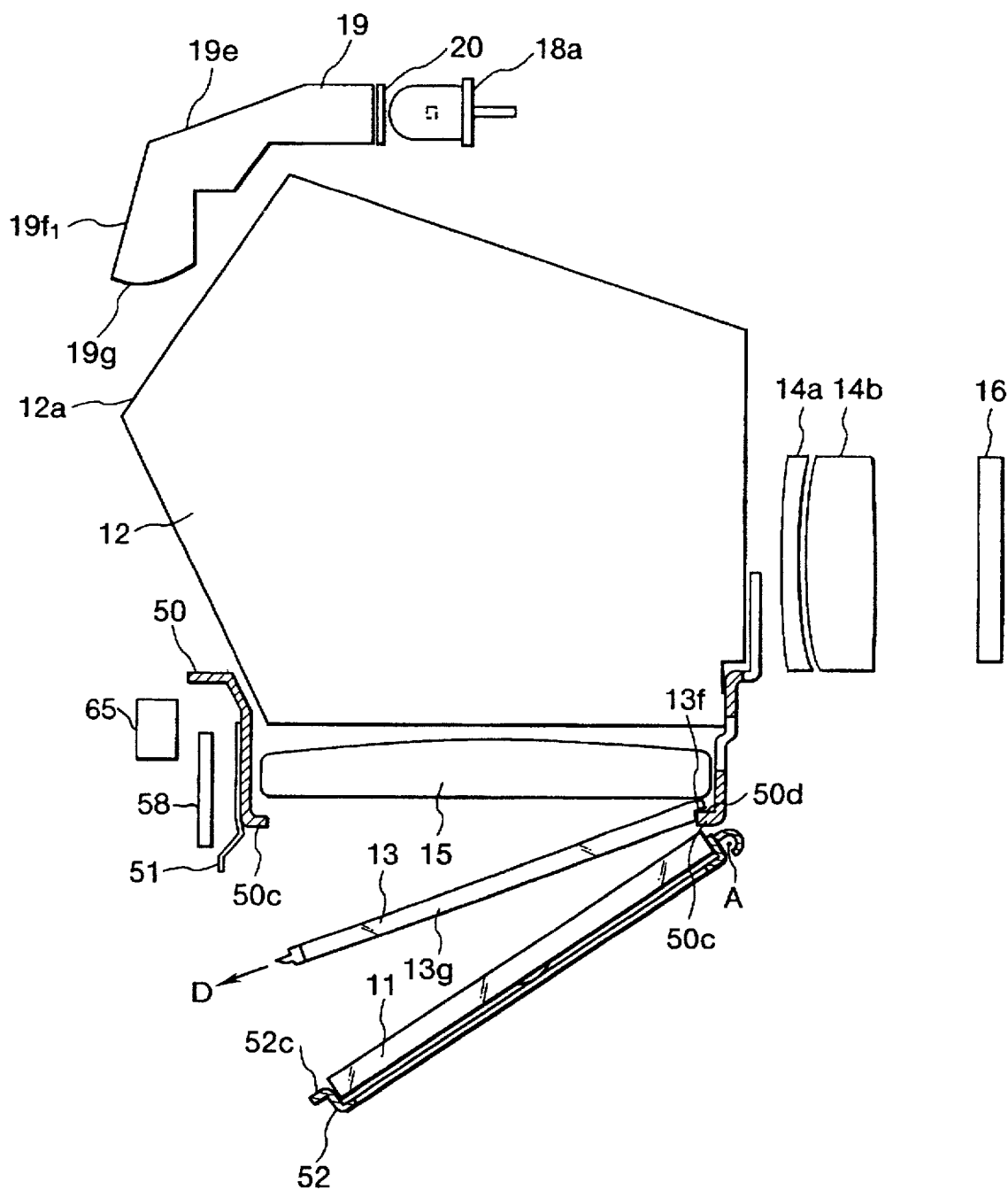
FIG. 10 is a sectional view showing a detached state of a reflection plate in the finder optical system shown in FIG. 8.

The display member holding mechanism will be described in detail below with reference to FIGS. 8 to 10. FIGS. 8 to 10 are sectional view of principal parts. FIG. 8 is a view showing the holding state of the display member and the focusing screen, FIG. 9 is a view showing a state wherein the holding state of the focusing screen is released, and FIG. 10 is a view showing a state wherein the holding states of the display member and the focusing screen are released after the shielding member 587 is detached. Therefore, the holding states of the two mechanism are released in the order from FIG. 8 to FIG. 10, and conversely, the display member and the focusing screen are attached in the order from FIG. 10 to FIG. 8.

The position, in the optical axis direction, of the reflection plate 13 as the display member in its holding state is restricted by two projections 13h and 13i of the reflection plate shown in FIG. 11, pawl portions 51d and 51e (FIG. 12) formed at the distal end portions of the arm portions of the holding member 51, notches 13f (FIGS. 10 and 11) of the reflection plate, and the reflection plate holding surface 50d (FIG. 10) as the rear surface of the focusing screen positioning surface 50c of the prism holder.

The notches 13f of the reflection plate 13 are supported by the reflection plate holding surface 50d, and the two projections 13h and 13i appearing from the notches 50c (FIG. 14) of the prism holder 50 are respectively supported from the below by the pawl portions 51d and 51e, so that the reflection plate 13 is prevented from dropping from a space below the condenser lens 15. On the other hand, the position, in the surface direction, of the reflection plate 13 is restricted by fitting the projections 13h and 13i into the notches 50c of the prism holder 50, and by pressing the two projections 13h and 13i of the reflection plate in the direction of an arrow C in FIG. 8 by the arm portions 51f and 51g of the holding member 51, and bringing the notches 13f of the reflection plate into contact with the corner portions of the reflection plate holding surface 50d.

The attachment or detachment process of the reflection plate will be explained below with reference to FIG. 10 to FIG. 15. The reflection plate 13 is attached/detached by removing the shielding member 58 via the mount 65, and pulling the two arm portions 51f and 51g in a direction perpendicular to the plane of the drawing of FIG. 10 using the upright bent portions 51j and 51k of the holding member 51, as described above. When the reflection plate has already been attached, the reflection plate 13 is rendered pivotal about the notches 13f upon releasing the support state of the pawl portions 51d and 51e of the holding member 51, and can be detached when it is pulled in the direction of an arrow D in FIG. 10. When the reflection plate is attached, the reflection plate is pivoted to its holding state position by pulling the arm portions 51f and 51g in a direction perpendicular to the plane of the drawing of FIG. 10, and then, the arm portions 51f and 51g are returned. In this manner, the position of the reflection plate is restricted, as described above, and attachment is completed. As described above, the reflection plate 13 is set and released by elastically deforming the arm portions 51f and 51g by utilising the flexibility of the holding member 51.

Dust on the reflection plate 13 stands out since the diopter of the finder optical system matches it, and often disturbs observation of an object image. However, with the above-mentioned arrangement, since the reflection plate can be easily detached, the internal mechanism of the camera can be cleaned very easily. Furthermore, since the display member can be detached only when the holding state of the focusing screen is released, the focusing screen can be prevented from being damaged upon detachment of the display member.

Figure 16:
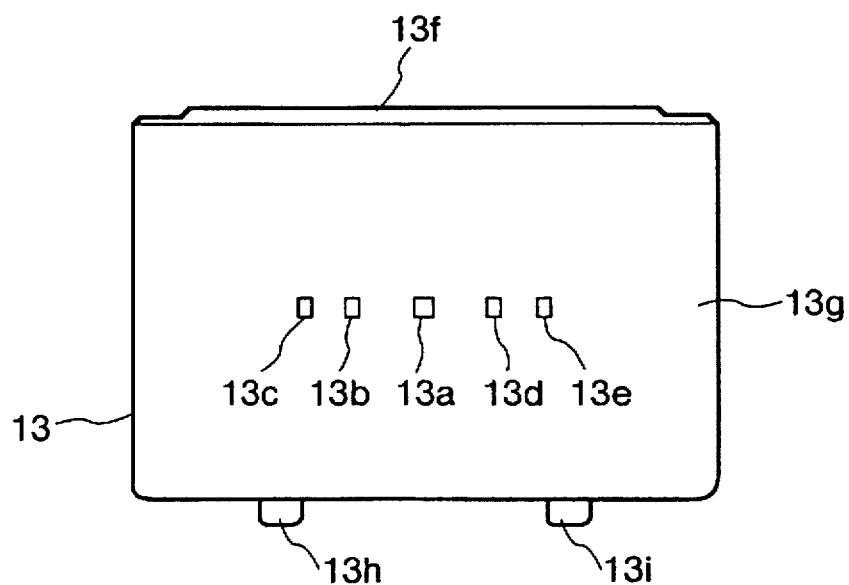
FIG. 16 is a plan view of a reflection plate which is applicable to the camera according to the embodiment of the present invention.
Figure 17:
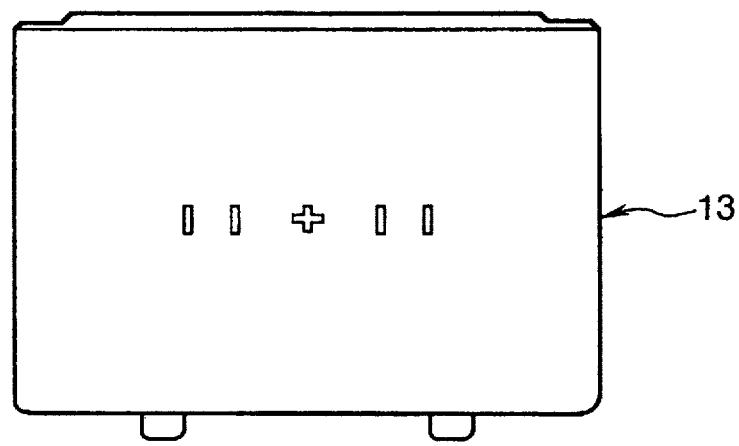
FIG. 17 is a plan view of another reflection plate which is applicable to the camera according to the embodiment of the present invention.
Figure 18:
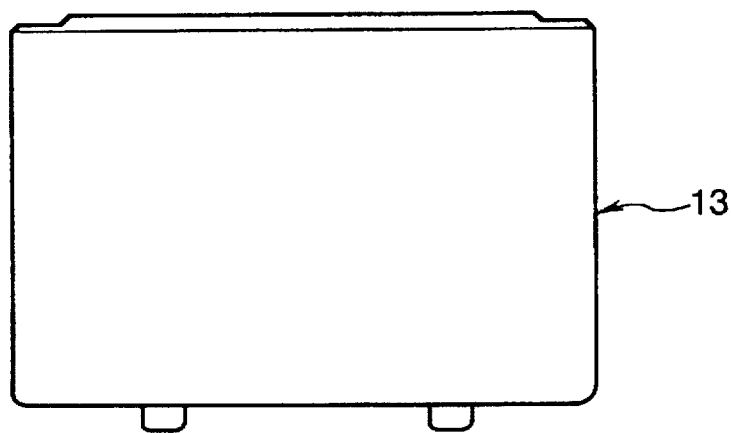
FIG. 18 is a plan view of still another reflection plate which is applicable to the camera according to the embodiment of the present invention.

As shown in FIGS. 16 to 18, reflection plates 13 having display portions of various display patterns may be prepared, and may be selectively used by a user. FIG. 16 is a plan view of the reflection plate shown in FIG. 13, FIG. 17 is a view of a reflection plate on which the shapes of distance measurement fields of a distance measurement device (not shown) are faithfully illustrated, and FIG. 18 is a view showing an example wherein no distance measurement fields are displayed. A user can select one of these reflection plates in correspondence with his or her favor.

The focusing screen holding mechanism will be described below. As shown in FIG. 8, the focusing screen holding frame 52 is a frame-shaped member, which pivots about a shaft A, and stores the focusing screen 11 therein. A projection 52c of the focusing screen holding frame engages with an aperture 51c formed above the spring portion 51h of the holding member 51.

When the distal end of the focusing screen holding frame 52 is pulled up from the state shown in FIG. 9, the projection 52c pushes away a tilt surface 51i of the spring portion 51c. When the distal end of the focusing screen holding frame 52 is further pulled up, the projection 52c falls into the aperture 51c, and is fixed in position, as shown in FIG. 8. At the same time, the focusing screen 11 contacts the positioning surface 50c of the prism holder 50, and is positioned in the optical axis direction. When the focusing screen is detached, the projection 52c disengages upon pulling the spring portion 51c, and the focusing screen 11 moves downward by its weight to the state shown in FIG. 9 together with the focusing screen holding frame 52. Thereafter, the focusing screen can be detached by holding the projection (Fresnel lens) 11a (FIG. 11).

Figure 19:
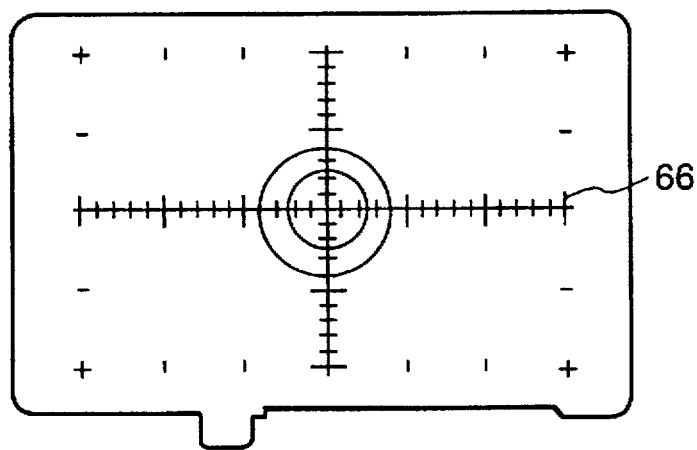
FIG. 19 is a plan view of a focusing screen which is applicable to the camera according to the embodiment of the present invention.
Figure 20:
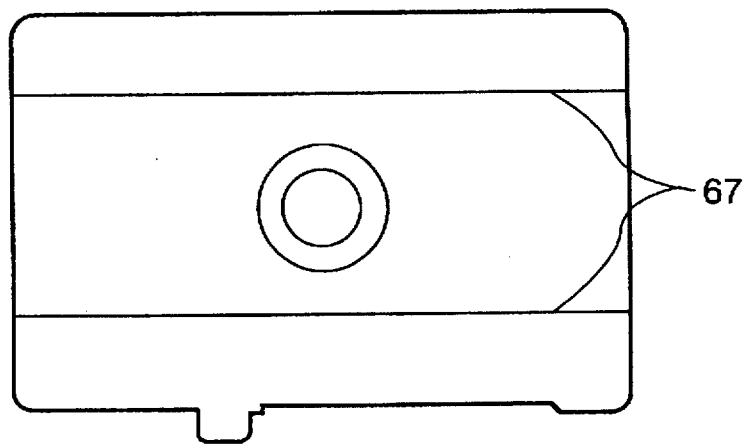
FIG. 20 is a plan view of another focusing screen which is applicable to the camera according to the embodiment of the present invention.

As shown in FIGS. 19 and 20, when exchangeable focusing screens on which scale marks 66, a panoramic photographing frame 67, and the like are printed are prepared, they can be selectively exchanged by the above-mentioned method.

As described above, since the reflection plate and the focusing screen are separately arranged, even when an exchangeable focusing screen, which is manufactured to be commonly used in many types of cameras, is used in the camera of this embodiment, the distance measurement field frames can be displayed by the superimpose device, and the compatibility of conventional accessories can be perfectly maintained while utilising the new display function of the camera.

Figure 21:
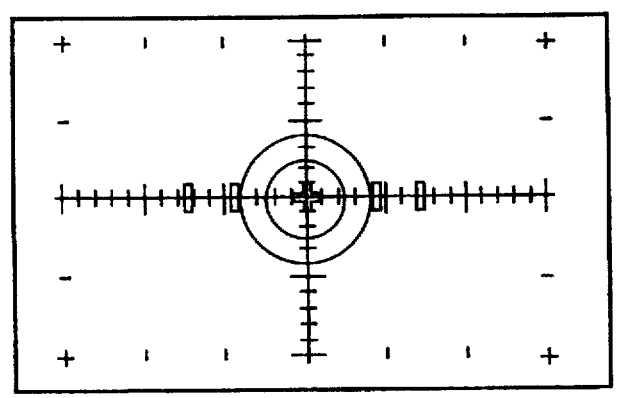
FIG. 21 is a view showing a finder field upon combination of a reflection plate and a focusing screen which are attached to the camera according to embodiment of the present invention.

FIG. 21 shows a finder field displayed when the reflection plate with the pattern shown in FIG. 17 and he focusing screen with the pattern shown in FIG. 19 are selected. When three different reflection plates and three different focusing screens are available like in this embodiment, they can be combined in nine different ways, and the degree of freedom of selection by a user is very high.

In a normal use state, the exchange frequency of focusing screens may be considered to be much higher than that of the display member. However, both of these members are transparent planar members having a size almost equal to the frame size, and are often confused with each other. However, An a normal state in which the shielding member 58 is attached, only the focusing screen can be detached, and only when the shielding member 58 is removed, the reflection plate can be detached. Therefore, the reflection plate can be prevented from being accidentally detached as a result of confusion of the focusing screen with the reflection plate.

Furthermore, in the above-mentioned arrangement, since the focusing screen 11 and its holding mechanism are located in a pivot path upon detachment of the reflection plate 13, the reflection plate cannot be detached unless the focusing screen is detached, thus providing a double error-free lock.

According to the invention described in claim 1, the superimpose function can operate even when a conventional focusing screen is attached, and the display member can be easily detached. Therefore, dust attached onto the display member can be removed without disassembling the camera. Since display portions need not be formed on all exchangeable focusing screens to assure the operation of the superimpose device, versatile focusing screens, which are designed to be commonly used in many types of cameras, can be used. In particular, since a single-lens reflex camera places an importance on the compatibility of accessories, its marketability can be remarkably improved.

According to the invention described in claim 2, the reflection plate can be prevented from being accidentally detached as a result of confusion of the focusing screen with the display member.

Also, a user can freely select and use a combination of a display member and a focusing screen.

In addition, the focusing screen can be prevented from being damaged upon detachment of the display member.

What is claimed is:

1. A camera or camera body comprising:
    a finder optical system including a pentagonal roof type optical element having a front upper portion, and an eyepiece lens unit;
    display portion carrying means arranged in said finder optical system below said pentagonal roof type optical element, and having a display portion, said display portion being arranged in an optical path of the finder optical system;
    a light source which is arranged over said pentagonal roof type optical element and emits illumination light; and
    a projection optical element for directing illumination light from said light source toward the display portion via the front upper portion of said pentagonal roof type element.

2. A camera or camera body according to claim 1, wherein said projection optical element has two reflection surfaces.

3. A camera or camera body according to claim 2, wherein said projection optical element has a lens function at a light exit end.

4. A camera or camera body according to claim 1, wherein a plurality of display portions are arranged in the optical path of the finder optical system, and a plurality of light sources are arranged over said pentagonal roof type optical element in correspondence with said plurality of display portions.

5. A camera or camera body according to claim further comprising:
    an outer case which covers said pentagonal roof type optical element and has a connection portion for an electronic flash device on a rear portion of an upper surface thereof.

6. A camera or camera body according to claim 1, further comprising:
    holding means for detachably holding said display portion carrying means.

7. A camera or camera body according to claim 1, wherein said finder optical system has a focusing screen.

8. A camera or camera body comprising:
    a finder optical system having a focusing screen, a pentagonal roof type optical element, and an eyepiece lens unit;
    focusing screen holding means for detachably holding said focusing screen;
    a display portion carrying member arranged adjacent to said focusing screen and having a display portion;
    carrying member holding means for detachably holding said display portion carrying member;
    display portion illumination means for illuminating said display portion; and
    shielding means for shielding said carrying member holding means from a photographing optical path,
    wherein, when said shielding means is detached from said camera or camera body, both said focusing screen holding means and said carrying member holding means are releasable, and
    when said shielding means is attached to said camera or camera body, only said focusing screen holding means is releasable.

9. A camera or camera body according to claim 8, wherein when said focusing screen is held by said focusing screen holding means, said display portion carrying member held by said carrying member holding means is prevented by said focusing screen or said focusing screen holding means from being detached.

* * * * *

UNITED STATES PATENT AND TRADEMARK OFFICE
CERTIFICATE OF CORRECTION

PATENT NO. : 5,734,428  
DATED : March 31, 1998  
INVENTOR(S) : YASUO SUDA, ET AL.

Page 1 of 4

It is certified that error appears in the above-indentified patent and that said Letters Patent is hereby corrected as shown below:

ON THE TITLE PAGE:

At [75] Inventors:

"Kagoshima;" should read --Yokohama;--

At [57] ABSTRACT

Line 1, "There is disclosed" should be deleted; and "a" (first occurrence) should be --A--.
Line 2, "which has" should read --includes--.
Line 5, "plane" should read --plane in--.
Line 11, "portion" should read --portion is--.

Column 1

Line 43, "The" should read --the--.

Column 4

Line 32, "of" (first occurrence) should read --of a--.
Line 35, "of" should read --of a--.

Column 5

Line 10, "8" should read --a--.
Line 27, "Sectional" should read --sectional--.
Line 33, "lens" should read --lens (not shown)--.
Line 36, "11b" should read --11b (see Fig. 4)--.
Line 40, "Type" should read --type--.

UNITED STATES PATENT AND TRADEMARK OFFICE
CERTIFICATE OF CORRECTION

PATENT NO. : 5,734,428

DATED : March 31, 1998

INVENTOR(S) : YASUO SUDA, ET AL.

It is certified that error appears in the above-indentified patent and that said Letters Patent is hereby corrected as shown below:

Column 6

Line 16, "speed" should read --speed,--.
    Line 28, "sideway," should read --from the side,--.
    Line 29, "expresses" should read --illustrates--.
    Line 57, "characteristics," should read
--characteristic,--
    Line 58, "controlling" should read --controlling an--.
    Line 60, "is" should read --is provided--.

Column 7

Line 17, "to" should read --in--.
    Line 66, "to" should read --in--.

Column 8

Line 10, "Light" should read --light--.
    Line 13, "lens," should read --lens.--.
    Line 19, "to" should read --in--.
    Line 41, "prism" (second occurrence) should read
--prism 12.--.
    Line 45, "plate" should read --plate 13--.
    Line 51, "The" should read --the--.

Column 9

Line 26, "an" should be deleted.

UNITED STATES PATENT AND TRADEMARK OFFICE
CERTIFICATE OF CORRECTION

PATENT NO. : 5,734,428  
DATED : March 31, 1998  
INVENTOR(S) : YASUO SUDA, ET AL.

Page 3 of 4

It is certified that error appears in the above-indentified patent and that said Letters Patent is hereby corrected as shown below:

Column 10

Line 17, "e" should read --a--.  
    Line 36, "e" should read --a--.  
    Line 43, "50c" should read --50c (see Figs. 10 and 14)--.  
    Line 63, "portions" should read --portions 51f, 51g--.

Column 11

Line 10, "through. The surface." should read --through the surface.--.  
    Line 16, "the" should be deleted.  
    Line 28, "Fig. 14" should read --Fig. 14,--.  
    Line 40, "51" should read --51h--.  
    Line 52, "view" should read --views--.  
    Line 58, "587" should read --58--.  
    Line 59, "mechanism" should read --mechanisms--.

Column 12

Line 8, "the" (first occurrence) should be deleted.  
    Line 58, "favor." should read --preference.--.

UNITED STATES PATENT AND TRADEMARK OFFICE
CERTIFICATE OF CORRECTION

PATENT NO. : 5,734,428
DATED : March 31, 1998
INVENTOR(S) : YASUO SUDA, ET AL.

It is certified that error appears in the above-indentified patent and that said Letters Patent is hereby corrected as shown below:

<u>Column 13</u>

Line 1, "51c." should read --51h--.
    Line 8, "51c," should read --51h,--.
    Line 39, "An" should read --in--.

<u>Column 14</u>

Line 28, "claim" should read --claim 1,--.

Signed and Sealed this

Twenty-fourth Day of November, 1998

Attest:

BRUCE LEHMAN

*Attesting Officer*    *Commissioner of Patents and Trademarks*